United States Patent
Herzer et al.

(10) Patent No.: US 9,949,499 B2
(45) Date of Patent: Apr. 24, 2018

(54) HANDHELD CONCEALED PILL MORSEL FORMER

(71) Applicant: PET PILL PAL LLC, Phoenix, AZ (US)

(72) Inventors: James Timothy Herzer, Phoenix, AZ (US); David D McClanahan, Harleysville, PA (US)

(73) Assignee: Pet Pill Pal LLC, Tempe, AZ (US)

( * ) Notice: Subject to any disclaimer, the term of this patent is extended or adjusted under 35 U.S.C. 154(b) by 64 days.

(21) Appl. No.: 15/171,853

(22) Filed: Jun. 2, 2016

(65) Prior Publication Data

US 2016/0353771 A1 Dec. 8, 2016

Related U.S. Application Data

(60) Provisional application No. 62/170,055, filed on Jun. 2, 2015.

(51) Int. Cl.
| | |
|---|---|
| *A23K 40/20* | (2016.01) |
| *B30B 9/28* | (2006.01) |
| *B30B 1/04* | (2006.01) |
| *A23K 50/40* | (2016.01) |
| *B30B 11/34* | (2006.01) |
| *B30B 15/02* | (2006.01) |
| *B30B 15/06* | (2006.01) |
| *B30B 15/32* | (2006.01) |

(52) U.S. Cl.
CPC .............. *A23K 40/20* (2016.05); *A23K 50/40* (2016.05); *B30B 1/04* (2013.01); *B30B 9/28* (2013.01); *B30B 11/34* (2013.01); *B30B 15/022* (2013.01); *B30B 15/065* (2013.01); *B30B 15/32* (2013.01)

(58) Field of Classification Search
CPC .. B30B 1/04; B30B 9/28; B30B 11/02; B30B 11/04; B30B 15/022; B30B 15/065; A23K 40/20
USPC ......................................................... 425/318
See application file for complete search history.

(56) References Cited

U.S. PATENT DOCUMENTS

| | | | | |
|---|---|---|---|---|
| 2,135,025 | A | * 11/1938 | Batjer ..................... | A01J 19/00 100/233 |
| 2,190,236 | A | * 2/1940 | King et al. ............... | A22C 7/00 425/318 |
| 3,536,074 | A | 10/1970 | Aufhauser | |
| 4,857,333 | A | 8/1989 | Harold | |
| 5,417,903 | A | * 5/1995 | Harrison ................. | B30B 11/02 264/109 |

(Continued)

*Primary Examiner* — James P MacKey
(74) *Attorney, Agent, or Firm* — Invention to Patent Services; Alex Hobson (57) ABSTRACT

A handheld concealed pill morsel former enables a user to easily conceal a pill within a morsel of malleable food product without excessive handling of the malleable food product. A first arm and a second arm are configured to rotated toward a top and bottom opening of a mold body cavity, respectively. A press extends from the first arm and is configured to extend into the mold cavity to compress the malleable food product. A plunger is coupled with the first arm and is configured to slide with respect to the first arm and press. The plunger has a plunger face that is configured to be extended down into the malleable food product to from a pill recess. A pill can then be placed into the pill recess and the press can be rotated back down into mold cavity to form a concealed pill morsel.

17 Claims, 11 Drawing Sheets

(56) References Cited

U.S. PATENT DOCUMENTS

| | | | |
|---|---|---|---|
| 5,654,003 A | 8/1997 | Fuisz et al. | |
| 5,674,515 A | 10/1997 | Wesenhagen | |
| 5,792,470 A | 8/1998 | Baumgardner, Sr. | |
| 5,895,662 A | 4/1999 | Meyer | |
| 6,143,316 A | 11/2000 | Hayden et al. | |
| 6,340,471 B1 | 1/2002 | Kershman et al. | |
| 6,602,518 B2 | 8/2003 | Donald Seislstad et al. | |
| 6,861,022 B2 | 3/2005 | Robinson et al. | |
| 7,247,011 B2 * | 7/2007 | St. Germain | A22C 7/0038 |
| | | | 425/318 |
| 7,513,767 B2 * | 4/2009 | Caboverde | A23P 30/10 |
| | | | 425/318 |
| 8,038,118 B1 * | 10/2011 | Ajakie | A47J 43/20 |
| | | | 249/156 |
| 8,501,218 B2 | 8/2013 | Hurwitz | |
| 2004/0247665 A1 | 12/2004 | Smith et al. | |
| 2005/0079264 A1 | 4/2005 | Leech et al. | |
| 2005/0169972 A1 | 8/2005 | Hasirci | |
| 2005/0175685 A1 | 8/2005 | Grandinetti | |
| 2014/0023694 A1 | 1/2014 | Young et al. | |
| 2014/0343004 A1 | 11/2014 | Derrieu et al. | |

\* cited by examiner

HANDHELD CONCEALED PILL MORSEL FORMER

CROSS REFERENCE TO RELATED APPLICATIONS

This application claims the benefit of U.S. provisional patent application No. 62/170,055, filed on Jun. 2, 2015, the entirety of which is hereby incorporated by reference.

BACKGROUND OF THE INVENTION

Field of the Invention

The invention relates to handheld devices configured to conceal a pill within a morsel of a malleable food product.

Background

Many pet owners struggle to get their pets to take medication in pill forms. Even when the pill is pushed back into the back portion of the pet's mouth or throat, they sometimes are able to spit the pill out. Some pet owners attempt to conceal the pill in a morsel of food which can be messy and difficult. Compacting the food product around a pill by hand results in limited success as providing enough pressure and uniform compression is difficult. In many cases the food product with the pill concealed therein falls apart before it can be given to the pet, or falls apart in the pet's mouth and again, they spit the pill out.

SUMMARY OF THE INVENTION

The invention is directed to a handheld concealed pill morsel former. The handheld apparatus enables a user to quickly and easily conceal a pill within a morsel of malleable food product without excessive handling of the malleable food product. The handheld concealed pill morsel former comprises a mold body having a cavity for the formation of the concealed pill morsel. In an exemplary embodiment, a first arm, and a second arm are configured to rotated toward a top and bottom opening of the mold body cavity, respectively. A press extends from the first arm and is configured to extend into the mold cavity to compress the malleable food product. A plunger is coupled with the first arm and is configured to slide with respect to the first arm and press. The plunger has a plunger face that is configured to be extended down into the malleable food product to from a pill recess. A pill can then be placed into the pill recess and the press can be rotated back down into mold cavity to form a concealed pill morsel. An additional amount of malleable food product may be, placed into the mold cavity after placement of the pill in the pill recess to ensure complete coverage and, concealment of the pill within the morsel.

In an exemplary embodiment, a handheld concealed pill morsel former comprises a first arm and a second arm that are attached to a common hinge and are configured to rotate about a rotational axis of the hinge. The first arm being configured to rotate toward the top opening of the cavity and the second arm configured to rotate toward the bottom opening of the cavity body to enable entrapment of the malleable food product within the cavity. In an exemplary embodiment, a first arm and/or a second arm comprises a handle portion that extends radially beyond the cavity for effective manipulation of the arm or arms and for additional leverage to mold and form a morsel from the malleable food product. The handle portions that extend out radially from the cavity will provide more torque around the rotational axis of the hinge.

An exemplary press extends from the first arm and is configured for insertion into the cavity. A press may be extended any suitable distance or portion of the depth of the cavity. In an exemplary embodiment, a press is configured for insertion from the top opening to at least the bottom opening and may be used to eject a concealed pill morsel from the cavity through the bottom opening. In still another embodiment, a press is configured to protrude from or extend past the bottom opening of the cavity.

An exemplary handheld concealed pill morsel former comprises a plunger that is slidably coupled with the first arm and is configured within a plunger opening in the first arm. The exemplary plunger is configured to slide with respect to the plunger opening and may have stops to limit the range of motion, or sliding range. The exemplary plunger is configured to slide toward the cavity and has a plunger face that is configured to extend past the extended end of the press to form a pill-recess. A handle end of the plunger may be used to grip and slide the plunger further into the malleable food product after the press has been closed over malleable food product configured within the cavity.

In an exemplary embodiment, a press comprises a pair of struts that are configured on opposing sides of the plunger. The struts may extend from either side of the plunger opening to a mold face that is made up of the strut faces, or extended ends of the struts, and the plunger face. In this embodiment, the plunger is configured to slide between the two struts and may comprise flanges and/or ribs to ensure proper spacing and guide the plunger during movement. A flange extended out past the plunger opening to create a retraction stop, or a stop that prevents a plunger from retracting completely through the plunger opening. Likewise, a plunger may comprise a plunge stop, such as an offset tab is configured on the handle end of the plunger. An offset tab may extend over the plunger opening to limit how far down the plunger can be slid through the plunger opening. The plunge stop controls how far beyond the strut face the plunger will extend and therefore controls the depth of the pill recess that is formed by the plunger. A plunge stop may comprise one or more offset tabs that are deformable, or can be forced into alignment with the plunger opening, such as by pinching. In an exemplary embodiment, a plunge stop comprises two offset tabs that are offset over the plunger opening on opposing sides of the plunger opening. Pinching of the two offset tabs together may be employed to align the offset tabs and slide the plunger down through the opening to remove it from the first arm. An offset tab may be deformed to enable the tab to fit through the plunger opening to reattach the plunger with the first arm. In an exemplary embodiment, the offset tabs are simply aligned with the opening or slot between the two struts and the plunger then slides up between the struts and through the plunger opening to reattach the plunger with the first arm.

A mold face is comprised of a press extended end and the plunger face. The two separate component may align substantially parallel with each other to form a mold face that fits within the top opening of the cavity for the compression of malleable food product and formation of a concealed pill morsel. A mold face may be substantially planar and the plane may be substantially perpendicular to the radius of rotation about the hinge. In an exemplary embodiment, as described herein, the press comprises the two struts configured on either side of the plunger. The mold face in this embodiment comprise the first and second strut faces and the plunger face that is configured at least partially between the two strut faces. In this embodiment, sliding of the plunger down and extension of the plunger face from the mold face creates a pill-recess that is centrally located within the compressed malleable, food product. A central configuration of the plunger face within the mold face is therefore preferred and may enable more effective concealment of a pill within a concealed pill morsel.

In an exemplary embodiment, the first arm, second arm, and mold body are detachably attachable. The handheld concealed pill morsel former may become soiled during use and cleaning of the components may be more effective when the components are detached. In still another embodiment, a plunger coupled with the first arm is detachably attachable from the first arm.

A hinge axle may be coupled with the mold body or an attachment extension of the mold body for the detachable attachment of the first and/or second arms. The first and second arms may comprise hooks that are configured to seat around the hinge axle to enable rotation about the hinge. The first and second arms may comprise one or more hooks for this purpose. It is to be understood that a hinge axle may an integral part, or be coupled to on any of the three components, first arm, second arm, and mold body, and the other components may comprise a hook for attachment to said hinge axle.

The inside surface of the press and/or the plunger may be configured with a radius of curvature that is substantially equal to a normal distance from said inside surface to a rotational axis of the hinge. In addition, the inside surface of the mold cavity may also comprise a corresponding radius of curvature, thereby enabling alignment of the mold face with the cavity throughout the stroke of the press and/or plunger.

In, an exemplary embodiment, a method is provided for forming a concealed, pill morsel utilizing a handheld concealed pill morsel former as described in any of the embodiments herein. An exemplary method comprises the steps of providing the handheld concealed pill morsel former, as described herein; rotating the second arm to cover the bottom opening of the cavity; placing a malleable food product within the cavity; rotating the second arm to insert the press and mold face down into the cavity to contact and alternatively compress the malleable food product therein; sliding the plunger to extend the plunger face down into the malleable food product to form a pill-recess; rotating the first arm away from the top opening of the cavity to expose the top opening and the malleable food product having a pill-recess; placing a pill into the pill-recess; and subsequent to placing the pill in the pill-recess, rotating the first arm back toward the top opening in the mold body to insert the press into the cavity to compress the malleable food product around the pill configured within the pill-recess; thereby forming a concealed pill morsel.

The method may further comprise the steps of placing an additional amount of malleable food product in the cavity through the top opening in the mold body after the step of placing a pill in the pill-recess and before the step of rotating the first arm back toward the top opening. In addition, a handheld concealed pill morsel former may be used to eject a concealed pill morsel from the cavity and may be used to dispense the morsel directly to a pet. The handheld concealed pill morsel former may be opened and placed near a pet and the concealed pill morsel may be forced through and out of the cavity directly to a pet.

An exemplary handheld concealed pill morsel former may be made out of any suitable material including, but not limited to, plastic, metal, composites and the like. A handheld concealed pill morsel former made from plastic may be lightweight and easier to manipulate and clean. An exemplary handheld concealed pill morsel former may be configured for making a morsel for direct consumption by a person or pet. The cross-dimension of the cavity may be about 6 cm or less, about 5 cm or less, about 3 cm or less and any range between and including the values provided. Put another way, the volume of the cavity, cross-sectional area times the depth, may be about 20 cc or less, about 15 cc or less, about 10 cc or less, about 5 cc or less and any range between and including the volumes provided. It may be important to limit the size and/or volume of the cavity and resulting concealed pill morsel produce therefrom to prevent choking.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIGS. 3A, 3B, 3C, 3D, and 3E show various views of an exemplary handheld concealed pill morsel former wherein. FIG. 3A is a top view.

FIGS. 4A, 4B and 4C show an exemplary handheld concealed pill morsel former n various orientations.

FIGS. 6A, 6B and 6C show an exemplary handheld concealed pill morsel former in various orientations.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments, of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
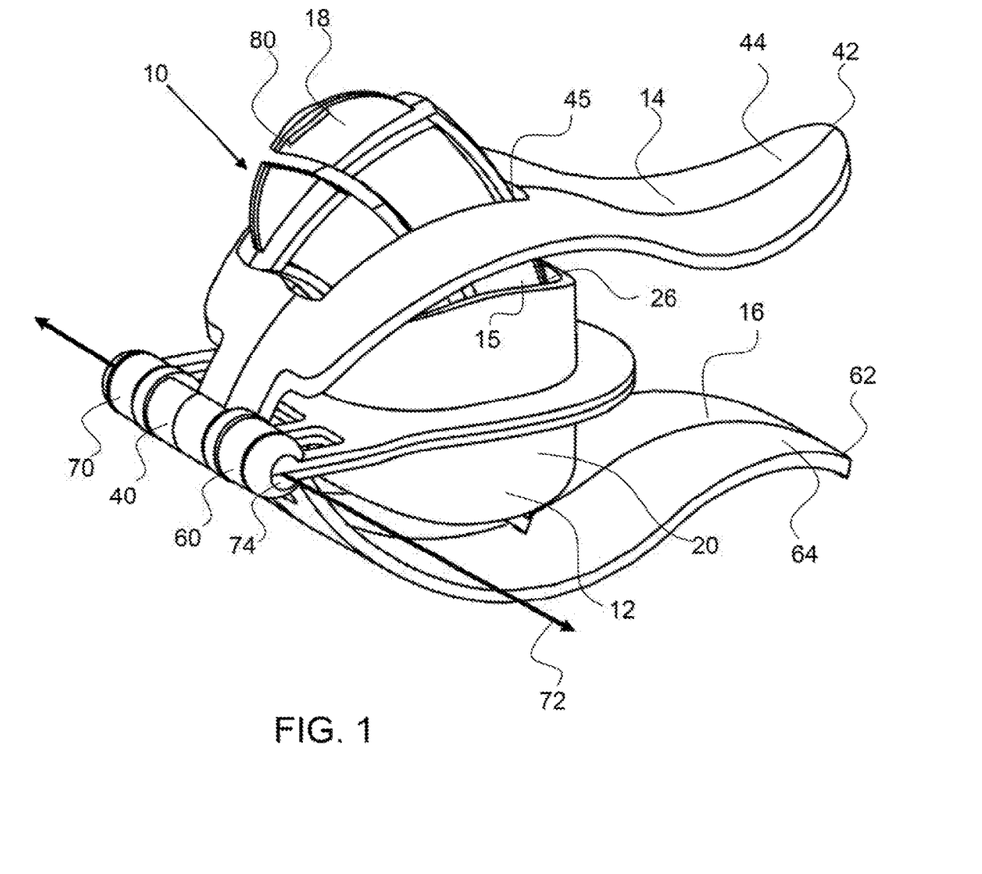
FIG. 1 shows a perspective view of an exemplary handheld concealed pill morsel former as described herein.

As shown in FIG. 1, an exemplary handheld concealed pill morsel former 10 comprises a first arm 14, a mold body 12, a second arm 16 and a plunger 18. The mold cavity is configured between the first and second arms and all three are pivotally connected to a hinge 70 having an axis of rotation 72. The first arm 14 has an attached end 40 and a handle portion 44 that extends to an extended end 42. The second arm 16 has an attached end 60 and a handle portion 64 that extends to an extended end 62. The mold body 12 comprises a hinge axle 74 for the attachment of the first and second arms. The first and second arms comprise hooks on the attached ends for attachment to the hinge. The mold body has a cavity 26 defined by an outer perimeter wall 20 and a press 15, coupled to the first arm, is configured for insertion into the cavity. A plunger 18 is slidably coupled with the first arm and extends up through a plunger opening 45 in the first arm. The plunger is configured to slide within the opening and comprises a handle end 80 and a plunger face for the formation of a pill-recess.

Figure 2:
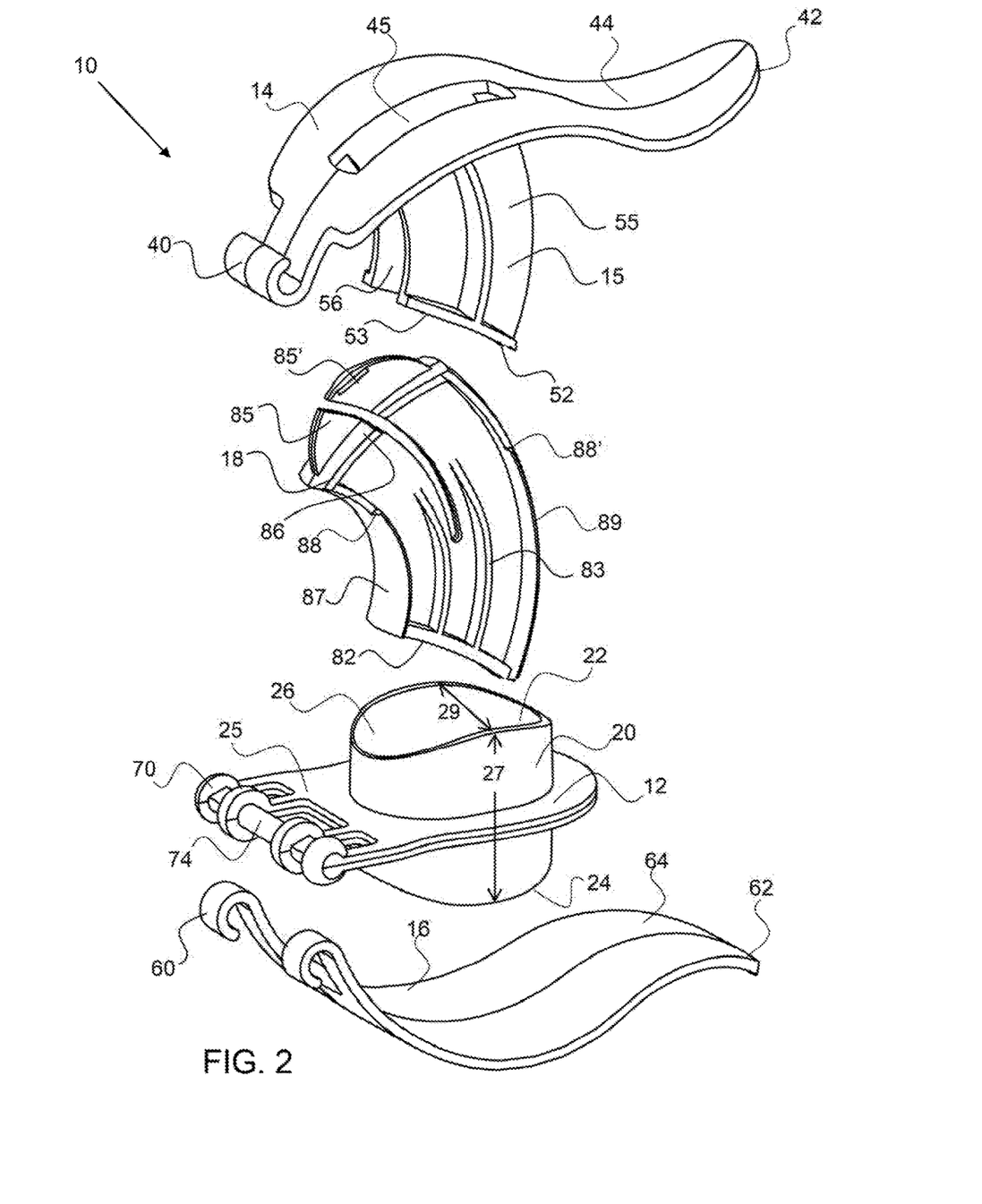
FIG. 2 shows an exploded view, of an exemplary handheld concealed pill morsel former.

As shown in FIG. 2, an exemplary handheld concealed pill morsel former 10 comprises four discrete components that are configured to couple in a unique way to enable the formation of a concealed pill morsel. The first arm 14, mold body 12 and second arm 16 are all configured to rotate about a hinge 70. The hinge is formed by the hinge axle 74 and the attached ends 40, 60 of the first and second arms, respectively. The first arm 14 comprises a curved handle portion 44 and an opening for coupling with a plunger. The second arm is configured to rotate up and against the bottom opening 24 of the cavity 26, and the first arm, with the press 15 extending therefrom, is configured to rotate down over the top opening 22 of the cavity. The two arms are configured to rotate and substantially seal the openings in the cavity.

The press 15, comprising two substantially parallel struts 55 and 56, is configured for insertion into the cavity for the purpose of pressing or compressing a malleable food product therein. The struts extend along a radius defined by the distance from the axis of rotation. A strut face 52 is configured on the extended end of each strut. The plunger 18 is configured to slide between the two struts 55, 56 and is configured to extend beyond the extended end of the struts, or strut faces 52, to form a pill-recess in a malleable food product. A plunger 18 is configured to slide between the two struts and has a plunger face 82 that is configured to align substantially parallel with the two strut faces 52 to from a mold face 53. The plunger has an inside 87 and outside surfaces 89. The inside surface and/or the outside surface may be configured to extend along a radius defined by the distance from the axis of rotation about the hinge 70. In addition, the plunger comprises ribs 83 that are configured to space and guide the plunger as it moves along the struts. Retraction stops 88, 88' on both the inside and outside surfaces of the plunger prevent the plunger form retracting up beyond the point where the plunger face 82 and strut faces 52 are aligned. The plunger also comprises offset tabs 85, 85 that creates a plunge stop 86. The plunge stop prevents the plunger from sliding completely through the plunger opening in the first arm. The radial distance from the retraction stops to the plunge stops defines the stroke distance of the plunger with respect to the struts or the first arm.

The mold body 12 defines a cavity 26 for retaining a malleable food product. The cavity has a top opening 22, bottom opening 24, perimeter wall 20, and a cross-dimension distance 29. A cavity, may have any suitable cross-sectional shape along the cavity depth 27 including, circular, oval, irregular shaped and the like. The mold body 12 comprises an attachment extension 25 and a hinge axle 74, for the attachment of the first and second arms. In an exemplary embodiment, the attachment extension, hinge axle and cavity 26 are a one-piece unit; such as a single molded piece.

The second arm 16 comprises a curved handle portion 64 that is configured to cover the bottom opening 24 of the cavity 26. The second arm is configured to rotate away from the bottom opening to enable a concealed pill morsel to be ejected from the cavity by the press or mold face.

Figure 3A:
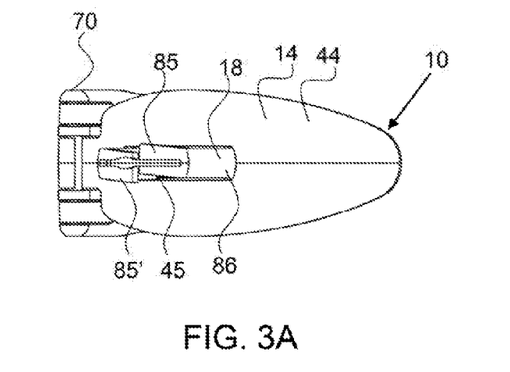
Figure 3B:
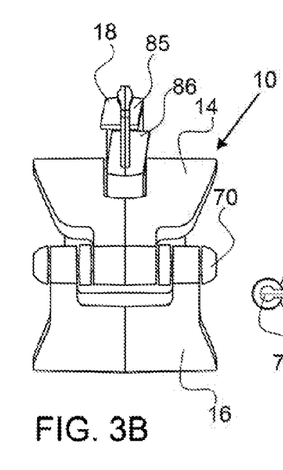
FIG. 3B is a back view.
Figures 3C, 3D:
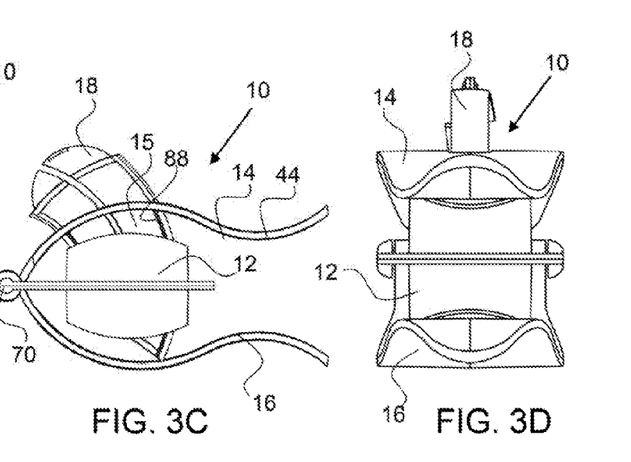
FIG. 3C is a side view.
FIG. 3D is a front view.
Figure 3E:
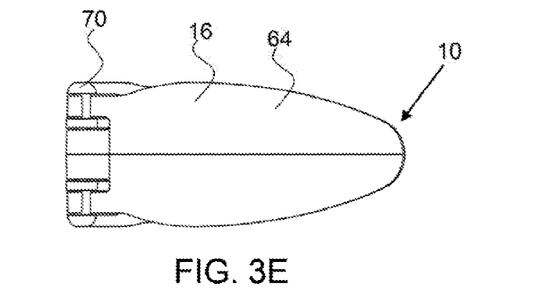
FIG. 3E is a bottom view.

FIGS. 3A-3E show various views of an exemplary handheld concealed pill morsel former wherein, FIG. 3A is a top view, FIG. 3B is a back view. FIG. 3C is a side view, FIG. 3D is a front view, and FIG. 3E is a bottom, view. FIG. 3A shows the plunge stop 86 comprising the two offset tabs 85, 85'. The offset tabs extend over the plunger opening 45 to prevent the plunger from sliding therethrough.

Figure 4A:
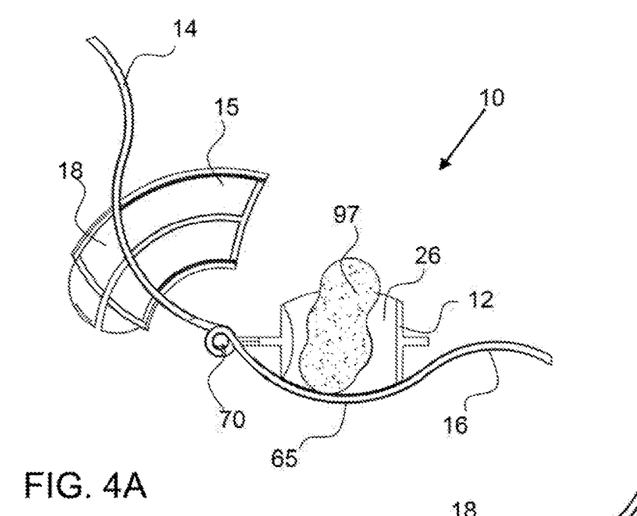
FIG. 4A shows the exemplary handheld concealed pill morsel former in an open configuration with a malleable food product in the cavity.
Figure 4B:
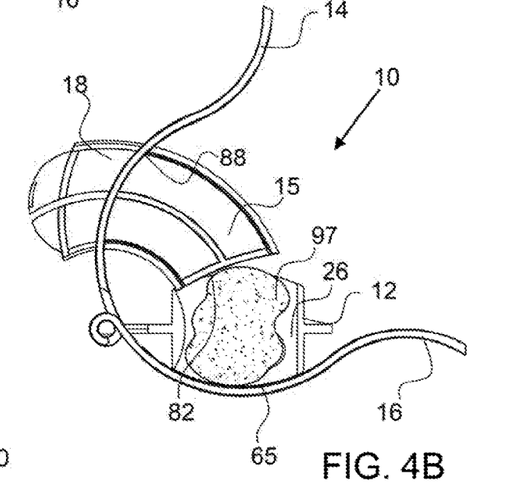
FIG. 4B shows the exemplary handheld concealed pill morsel former with the press being closed over the cavity top opening.
Figure 4C:
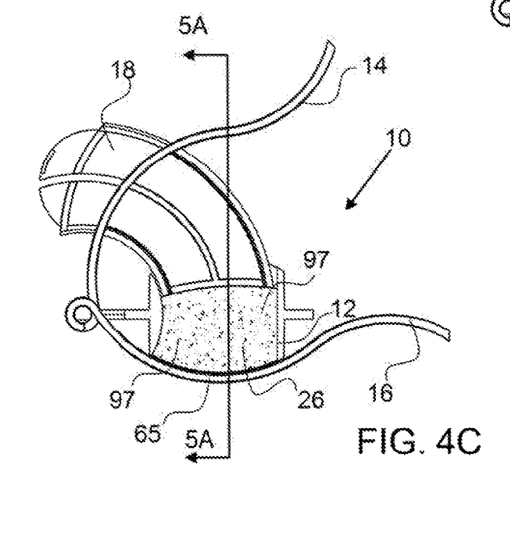
FIG. 4C shows the exemplary handheld concealed pill morsel former with the press extending partially into the cavity.

FIGS. 4A-4C show an exemplary handheld concealed pill morsel former in various orientations. In FIG. 4A, the exemplary handheld concealed pill morsel former 10 is in an open configuration with a malleable food product 97 in the cavity 26. In FIG. 4B, the exemplary handheld concealed pill morsel former 10 is oriented with the press 15 closed down over the cavity top opening. In FIG. 4C, the press 15 is extending partially into the cavity 26 to compress the malleable food product 97. A cover portion 65 of the second arm 16 covers and effectively seals the bottom opening 24 of the cavity in FIGS. 4A-4C.

Figure 5A:
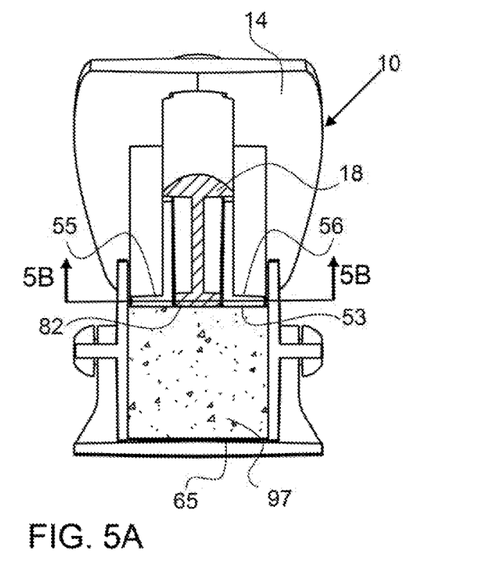
FIG. 5A shows a sectional view of the exemplary handheld concealed pill morsel former shown in FIG. 4C along line 5A, with the plunger and struts forming a substantially planar mold face.
Figure 5B:
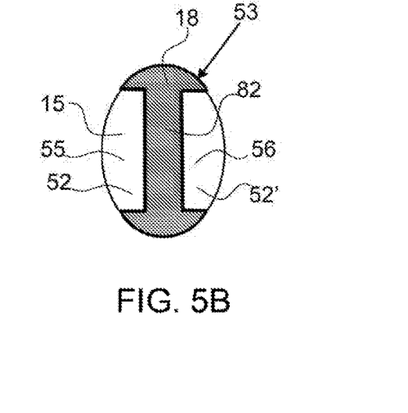
FIG. 5B is a sectional view of the exemplary mold face of the handheld concealed pill morsel former shown in FIG. 5A along line 5B.

As shown in FIG. 5A, an exemplary handheld concealed pill morsel former 10 is oriented with the press extending into the cavity 26 to compress a malleable food product 97. The plunger 18 and the struts 55, 56 form a substantially planar mold face 53. As shown in FIG. 5B, the mold face comprises the plunger face 82 configured between the two strut faces 52, 52'. The three faces substantially align to form a mold face 53 for the compression of a malleable food product within the cavity.

Figure 5C:
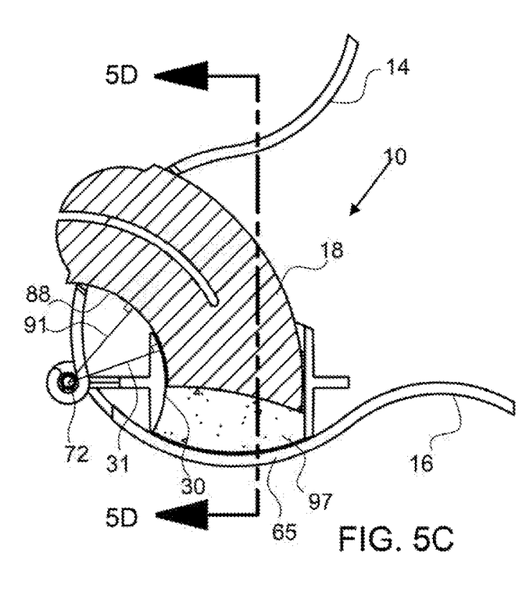
FIG. 5C shows an exemplary handheld concealed pill morsel former having the press extending down into the cavity and the plunger extended to form a pill-recess within the malleable food product.
Figure 5D:
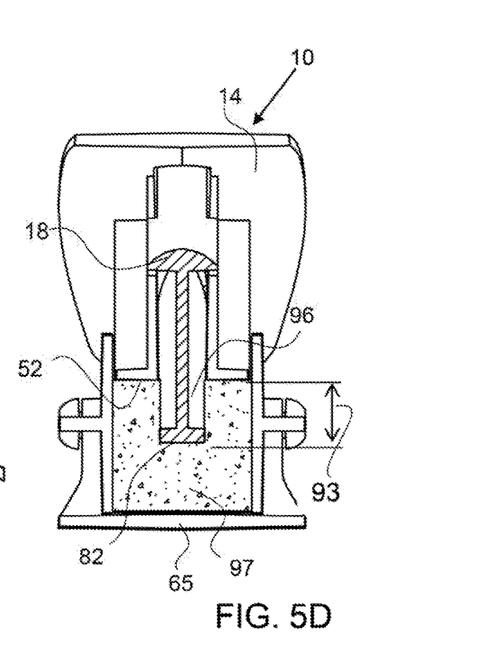
FIG. 5D is a sectional view of the exemplary handheld concealed pill morsel former shown in FIG. 5C along line 5D with the plunger extended to form a pill-recess.

As shown in FIGS. 5C and 5D, the plunger 18 is extended down into the malleable food product 97 to form a pill-recess 96 having a depth 93. The plunger face 82 is extended down past the strut face 52. The plunger may be retracted back up and the first arm rotated back to expose the top opening of the cavity and the molded food product having a pill-recess therein.

As shown in FIG. 5C, the plunger inside surface 88 is configured with radius of curvature that is substantially equal to a normal distance 91 from the inside surface to a rotational, axis 72 of the hinge. Likewise, the cavity is configured with an inside surface 30 configured with a radius of curvature that is substantially equal to a normal distance 31 from said inside surface to a rotational axis 72 of the hinge.

Figure 6A:
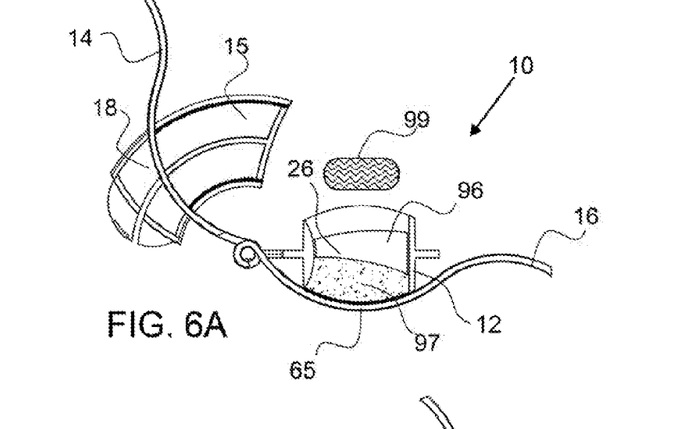
FIG. 6A shows the exemplary handheld concealed pill morsel former in an open configuration and a malleable food product in the cavity having a pill-recess formed therein.
Figures 6B, 6C:
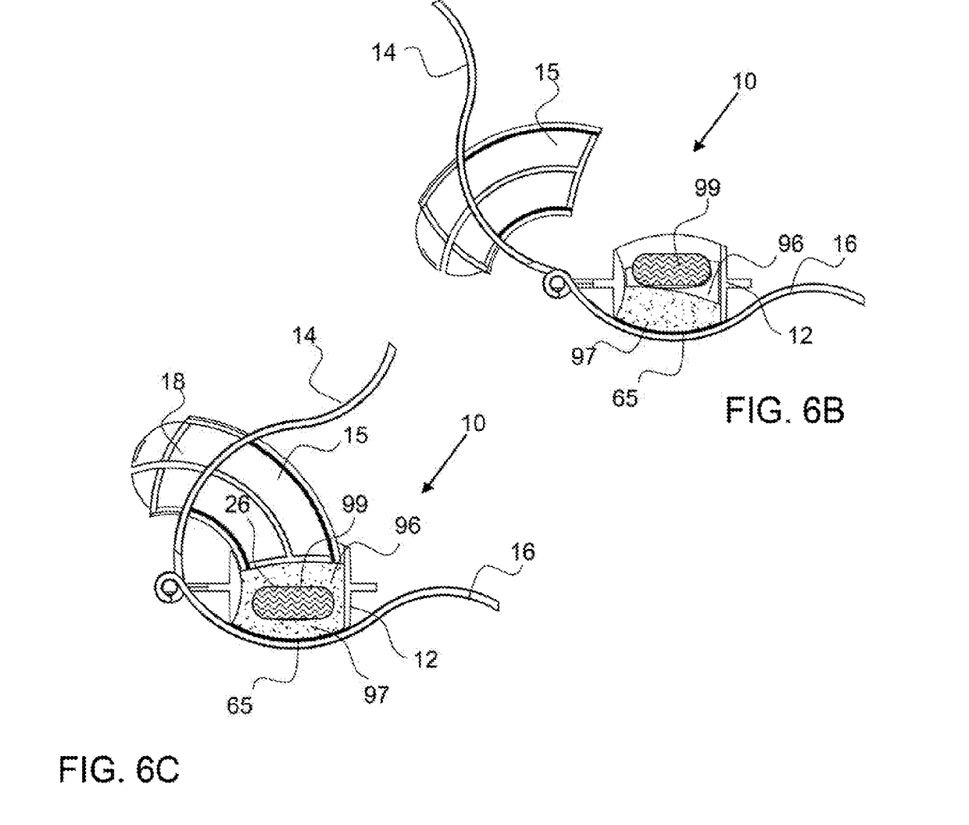
FIG. 6B shows the exemplary handheld concealed pill morsel former with the press in an open configuration and a pill located in the pill-recess.
FIG. 6C shows the exemplary handheld concealed pill morsel former with the press extending partially into the cavity.

As shown in FIGS. 6A-6C, a pill 99 is being placed into the pill-recess 96 and concealed within a morsel of malleable food product 97. In FIG. 6A, the first arm 14 is rotated to an open orientation to expose the molded food product having a pill-recess 96 therein. In FIG. 6B, the pill is placed within the pill-recess. In FIG. 6C, the first arm is rotated back down to mold malleable food product 97 around the pill 99 within the cavity 26.

Figure 7:
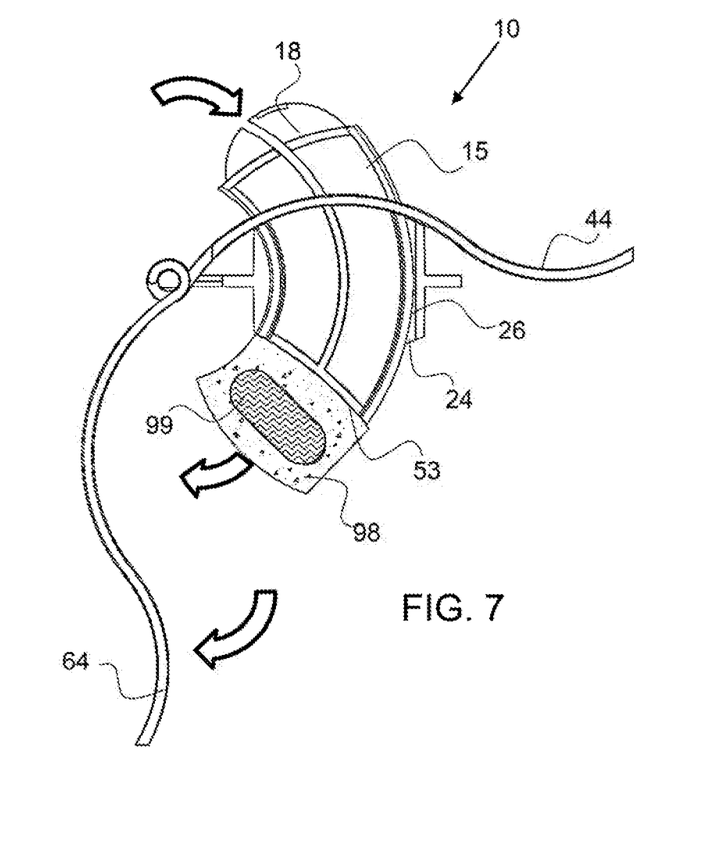
FIG. 7 shows an exemplary handheld concealed pill morsel for former ejecting a concealed pill morsel.

As shown in FIG. 7, an exemplary handheld concealed pill morsel former 10 is oriented to eject a concealed pill morsel 98 from the cavity 26. The second arm 16 is open and the press is extended down through the cavity 26 to eject the morsel containing a pill through the bottom opening 24. The mold face 53 is extended or plunged beyond the bottom opening 24.

Figure 8A:
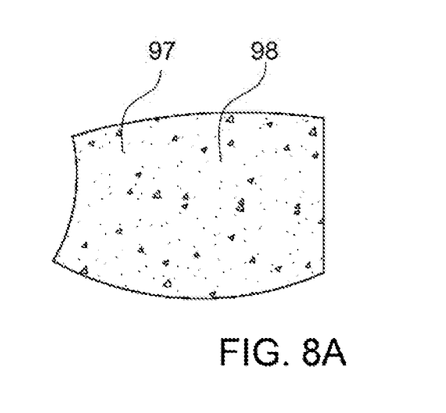
FIG. 8A shows side view an exemplary concealed pill morsel.
Figure 8B:
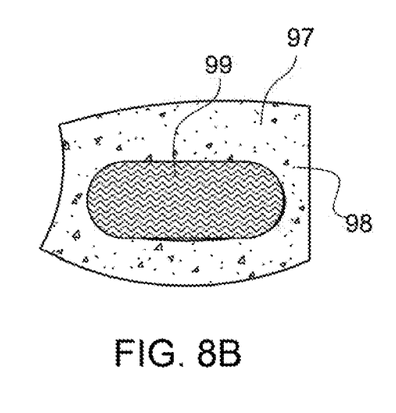
FIG. 8B shows a cross-sectional side view of an exemplary concealed pill morsel having a pill therein.

As shown in FIG. 8A, an exemplary concealed pill morsel 98 may have malleable food product 97 surrounding the pill 99. As shown in FIG. 8B, the outer surface of an exemplary concealed pill morsel 98 may only be food product, thereby concealing a pill therein.

Figure 9:
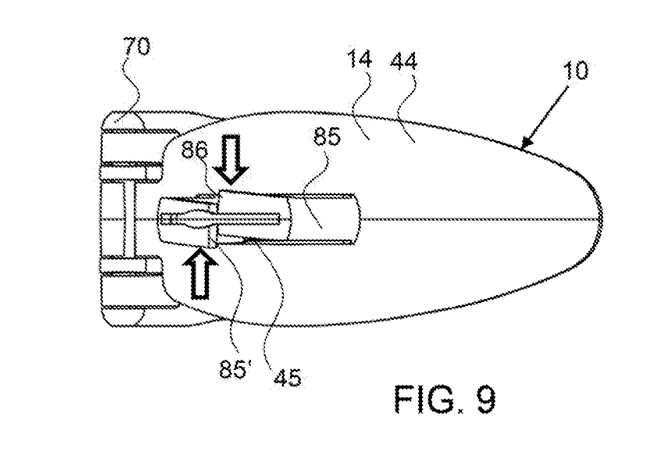
FIG. 9 shows a top view of an exemplary handheld concealed pill morsel former having a deformable stop.
Figure 10:
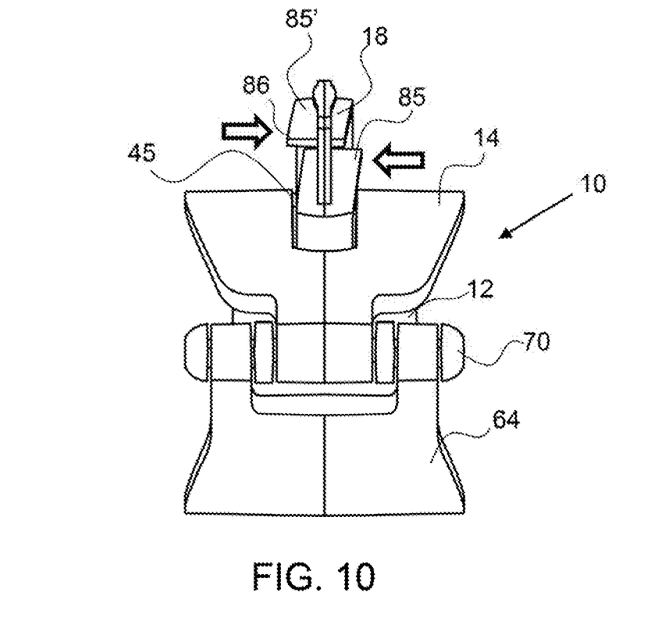
FIG. 10 shows a back view of an exemplary handheld concealed pill morsel former having a deformable stop.

As shown in FIGS. 9 and 10, the offset stops 85, 85' extend over the plunger opening 45 to create a plunge stop 86 that prevents the plunger 18 from sliding through the opening. As indicated by the two bold arrows, the offset tabs may be deformed, such as by pinching, into alignment with the plunger opening 45 to enable the plunger to be removed from the first arm 14. The bold arrow indicate an alignment force required to bring the offset tabs into alignment with the plunger opening 45.

Figures 11A, 12A:
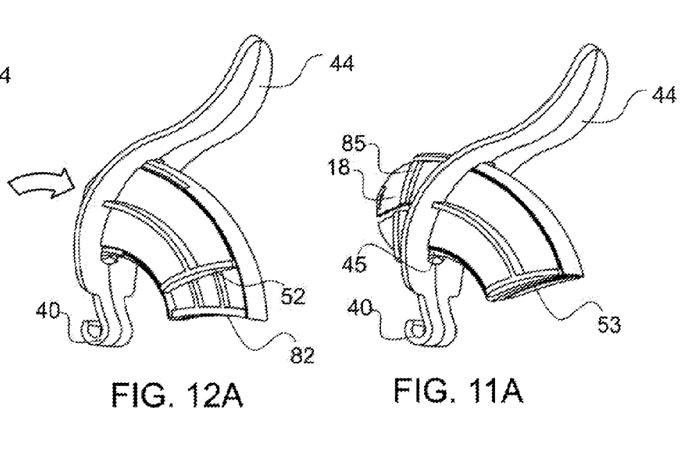
FIG. 11A shows a bottom perspective of a first arm with a plunger inserted therein.
FIG. 12A shows a bottom perspective view of a plunger extending out from the first arm.
Figure 11B:
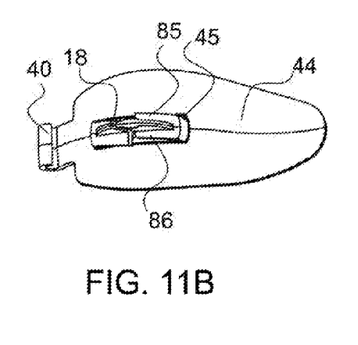
FIG. 11B shows a top view of an exemplary plunger extending through a first arm.
Figure 12B:
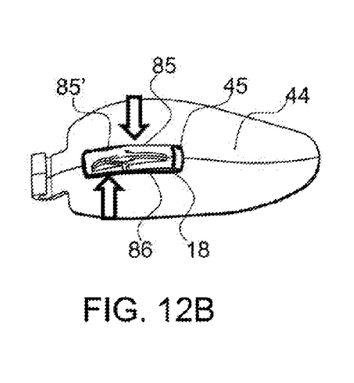
FIG. 12B shows a top view of an exemplary plunger being pressed down into the first arm.
Figure 13A:
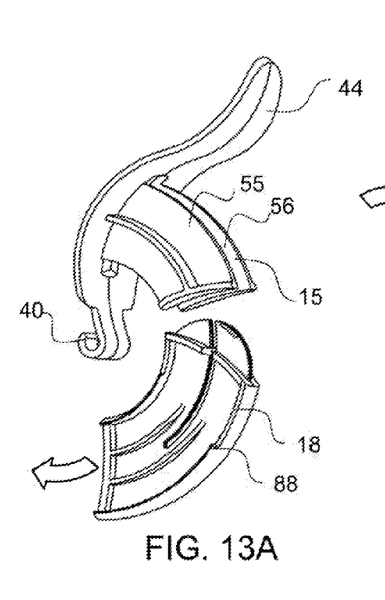
FIG. 13A shows a bottom perspective view of a plunger be removed from the first arm.
Figure 13B:
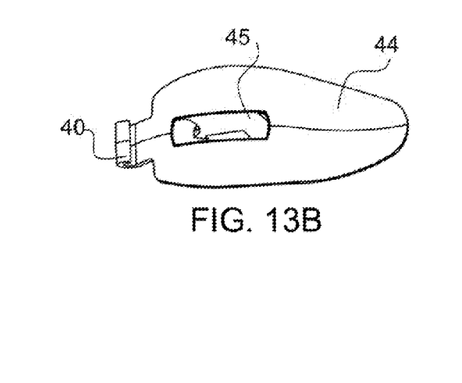
FIG. 13B shows a top view of an exemplary plunger being detached from the first arm.

FIGS. 11 through 13 show the plunger 18 in various orientations as is detached from the first arm 14. As shown in FIGS. 11A and 11B, an exemplary plunger 18 is attached and extends through a first arm 14. The offset tab 85 is at least partially extend outside of the plunger opening 45 to prevent the plunger from sliding through the opening. The mold face 53 is substantially flush in FIG. 11A, wherein the plunger is in a retracted orientation. As shown in FIGS. 12A and 12B, the offset tabs 85, 85' are squeezed and forced into alignment with the plunger opening 45. The plunger is extended down, or slid between the struts such that the plunger face 82 is no longer flush with the strut face 52. As shown in FIGS. 13A and 38, the plunger 18 has been completely slid out and detached from the first arm 14.

Figure 14A:
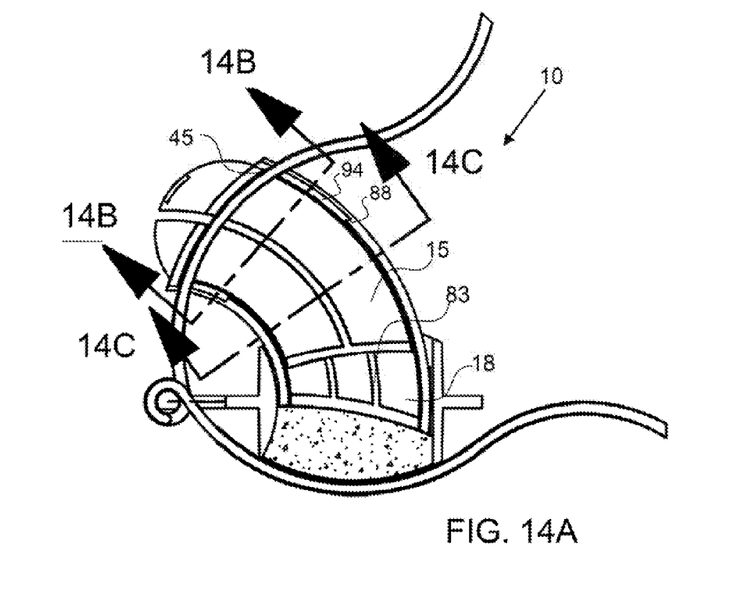
FIG. 14A shows a side sectional view of an exemplary handheld concealed pill morsel former having the plunger in a projected configuration.
Figure 14B:
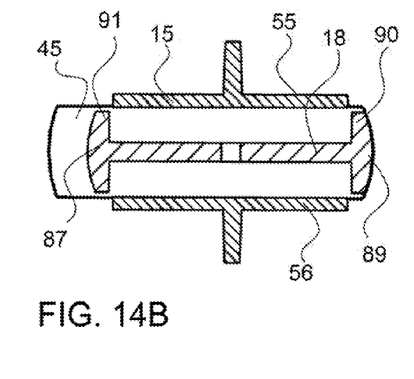
FIG. 14B shows a cross-sectional view along line 14B of FIG. 14A.
Figure 14C:
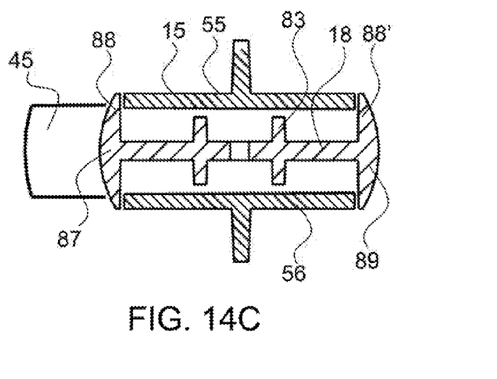
FIG. 14C shows a cross-sectional view along line 14C of FIG. 14A.

As shown in FIGS. 14A to 14C, the plunger 18 comprises ribs 83 that provide spacing and alignment between the plunger and the struts 55, 56. The plunger 18 is configured with flanges 90 along the inside surface 87 and outside surface 89. Along the slidable portion 94 of the plunger, the portion of the plunger that can freely slide within the plunger opening, the flanges are more narrow than the plunger opening as shown in FIG. 14B. The flanges extend out further than the plunger opening 45 to create retraction stops 88, 88' as shown in FIG. 14C. The extended flange further guides and plunger 18 within the struts.

Figure 15:
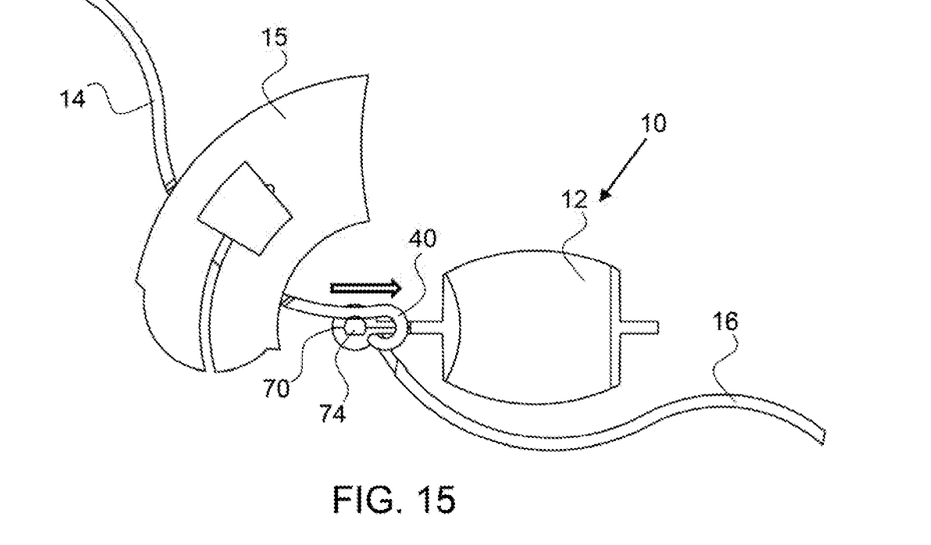
FIG. 15 shows a side sectional view of an exemplary handheld concealed pill morsel former with the first arm being detached from the hinge.

As shown in FIG. 15, the first arm 14 may be detached from the exemplary handheld concealed pill morsel former 10 by detaching the attached end 40 from the hinge 70, or hinge axle 74. The hinge axle is configured with a flat portion that allows the hook of the attached end to detachably attach.

Figure 16:
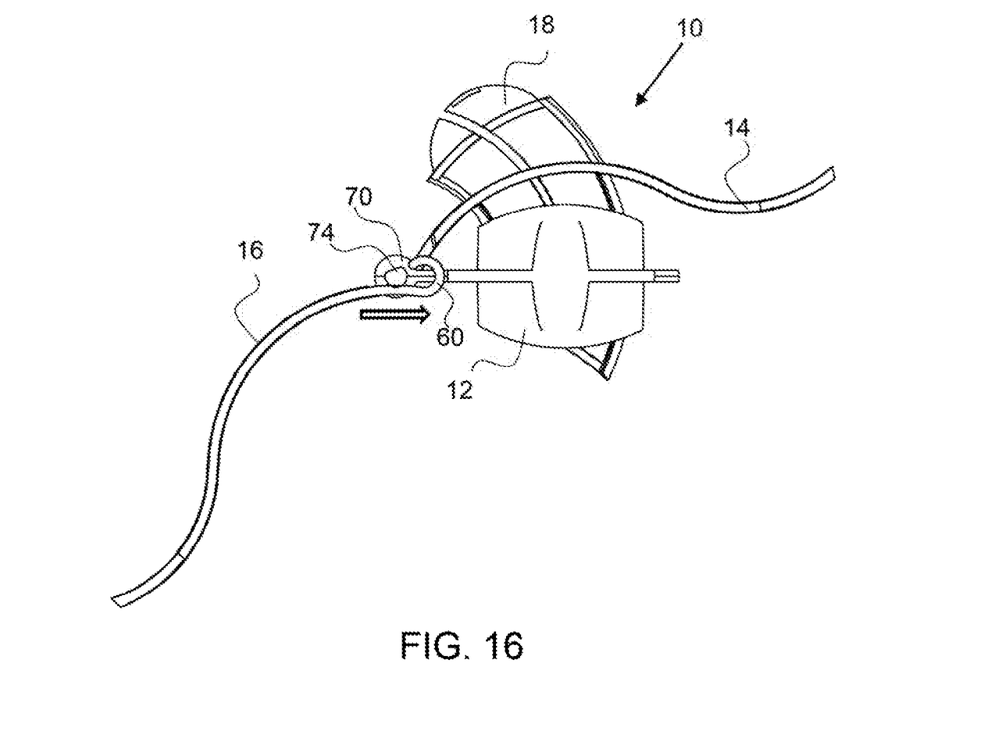
FIG. 16 shows a side sectional view of an exemplary handheld concealed pill morsel former with the second arm being detached from the hinge.

As shown in FIG. 16, the second arm 16 may be detached from the exemplary handheld concealed pill morsel former 10 by detaching the attached end 60 from the hinge 70, or hinge axle 74. The hinge axle is configured with a flat portion that allows the hook of the attached end to detachably attach.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A handheld concealed pill morsel former comprising:
   a) a mold body comprising:
      i) a top opening;
      ii) a bottom opening;
      iii) a cavity having a depth from the top opening to the bottom opening;
      iv) a perimeter wall forming said cavity;
   b) a first arm comprising:
      i) an attached end that is coupled with a hinge;
      ii) an extended end that is rotatable about said hinge;
      iii) a press that extends from the first arm to a mold face;
      wherein the mold face is configured to extend through the top opening and at least partially into the cavity;
   c) a second arm comprising:
      i) an attached end that is coupled with the hinge;
      ii) an extended end that is rotatable about said hinge;
      wherein the second arm is configured to rotate into contact with the cavity and cover the bottom opening of the cavity;
   d) a plunger that is slidably engaged with the first arm;
      wherein the plunger comprises a handle end and an opposing plunger face;
      wherein the plunger is configured to slide with respect to the first arm to extend the plunger face from the mold face to create a pill-recess during use;
      whereby in use, a malleable food product placed into the cavity is formed into a concealed pill morsel when a pill is placed in said pill-recess formed by the plunger face extending into the malleable food product.

2. The handheld concealed pill morsel former of claim 1, wherein the first arm, second arm, plunger and mold body are detachably attachable with the handheld concealed pill morsel former.

3. The handheld concealed pill morsel former of claim 1, wherein a hinge axle is coupled with the mold body; and
   wherein the first arm and second arm are coupled to the hinge axle and are configured to rotate about a rotational axis of the hinge.

4. The handheld concealed pill morsel former of claim 1, wherein the first arm comprises a plunger opening and wherein the plunger extends through said plunger opening.

5. The handheld concealed pill morsel former of claim 4, wherein the press comprises a first strut and a second strut configured on opposing sides of the plunger.

6. The handheld concealed pill morsel former of claim 5, wherein said first strut has a first strut face and said second strut has a second strut face;
   wherein the plunger face and said first and second strut faces are configured to substantially align in parallel to form the mold face.

7. The handheld concealed pill morsel former of claim 4, wherein the plunger comprises a plunge stop to prevent the handle end of the plunger from sliding completely through the plunger opening during use.

8. The handheld concealed pill morsel former of claim 7, wherein the plunge stop comprises at least one offset tab that extends over the plunger opening to prevent the plunger from sliding completely through the plunger opening during use.

9. The handheld concealed pill morsel former of claim 7, wherein the plunge stop controls a pill recess depth.

10. The handheld concealed pill morsel former of claim 8, wherein the at least one offset tab is deformable;
    whereby the offset tab is configured to align, with the application of an alignment force, with the plunger opening to slide the plunger out of the first arm.

11. The handheld concealed pill morsel former of claim 4, wherein the plunger comprises a retraction stop to prevent the plunger from retracting out of the plunger opening during use.

12. The handheld concealed pill morsel former of claim 11, wherein the retraction stop comprises a flange that extends from the plunger and extends beyond the plunger opening.

13. The handheld concealed pill morsel former of claim 12, wherein the retraction stop comprises a flange on an inside surface and on an outside surface of the plunger.

14. The handheld concealed pill morsel former of claim 1, wherein the first arm has a handle portion that extends beyond the cavity in a radial direction from the hinge when the press is inserted at least partially into the cavity.

15. The handheld concealed pill morsel former of claim 1, wherein the second arm has a handle portion that extends beyond the cavity in a radial direction from the hinge when the second arm rotated into contact with the cavity.

16. The handheld concealed pill morsel former of claim 1, wherein the mold face is configured to extend through the depth of the cavity at least to the bottom opening of the cavity.

17. A handheld concealed pill morsel former comprising:
   a) a mold body comprising:
      i) a top opening;
      ii) a bottom opening;
      iii) a cavity having a depth from the top opening to the bottom opening;
      iv) a perimeter wall forming said cavity;
   b) a first arm comprising:
      i) an attached end that is coupled with a hinge;
      ii) an extended end that is rotatable about said hinge;
      iii) a press that extends from the first arm to a mold face;
      wherein the mold face is configured to extend through the top opening and at least partially into the cavity;
   c) a second arm comprising:
      i) an attached end that is coupled with the hinge;
      ii) an extended end that is rotatable about said hinge;
      wherein the second arm is configured to rotate intra contact with the cavity and cover the bottom opening of the cavity;
   d) a plunger that is slidably engaged with the first arm;
      wherein the plunger comprises a handle end and an opposing plunger face;
      wherein the plunger is configured to slide with respect to the first arm to extend the plunger face from the mold face to create a pill-recess during use;
      whereby in use, a malleable food product placed into the cavity is formed into a concealed pill morsel when a pill is placed in said pill-recess formed by the plunger face extending into the malleable food product
      wherein the first arm, second arm, plunger and mold body are detachably attachable with the handheld concealed pill morsel former;
      wherein a hinge axle is coupled with the mold body;
      wherein the first arm and second arm are coupled to the hinge axle and are configured to rotate about a rotational axis of the hinge;
      wherein the press comprises a first strut and a second strut configured on opposing sides of the plunger;

wherein said first strut has a first strut face and said second strut has a second strut face;

wherein the plunger face and said first and second strut faces are configured to substantially align in parallel to form the mold face.

\* \* \* \* \*